United States Patent [19]

Jaspers

[11] Patent Number: 5,734,746
[45] Date of Patent: Mar. 31, 1998

[54] PICTURE SIGNAL ENHANCEMENT CIRCUIT INCLUDES A NON-LINEAR CIRCUIT FOR ENHANCING THE PICTURE SIGNAL IN DEPENDENCE OF HISTOGRAMS MEASURED AT TRANSITIONS IN THE PICTURE SIGNAL

[75] Inventor: Cornelis A. M. Jaspers, Eindhoven, Netherlands

[73] Assignee: U.S. Philips Corporation, N.Y., N.Y.

[21] Appl. No.: 704,401

[22] Filed: Aug. 27, 1996

Related U.S. Application Data

[63] Continuation of Ser. No. 318,006, Oct. 4, 1994, abandoned.

[30] Foreign Application Priority Data

Oct. 8, 1993 [BE] Belgium ................. 09301060

[51] Int. Cl.⁶ ........................................... G06K 9/00
[52] U.S. Cl. ............................... 382/169; 382/266
[58] Field of Search ..................... 382/168, 169, 382/172, 266; 348/672, 674, 254

[56] References Cited

U.S. PATENT DOCUMENTS

| | | | |
|---|---|---|---|
| 3,979,555 | 9/1976 | Opittek et al. | 348/672 |
| 4,337,514 | 6/1982 | Favreau et al. | 364/515 |
| 4,516,167 | 5/1985 | Dion et al. | 358/160 |
| 5,089,890 | 2/1992 | Takayama | 358/164 |
| 5,101,440 | 3/1992 | Watanabe et al. | 348/672 |
| 5,239,378 | 8/1993 | Tsuji et al. | 382/169 |
| 5,294,986 | 3/1994 | Tsuji et al. | 348/672 |
| 5,296,919 | 3/1994 | Maruno et al. | 348/675 |
| 5,296,941 | 3/1994 | Izawa et al. | 358/458 |
| 5,490,222 | 2/1996 | Sugimoto | 382/168 |

FOREIGN PATENT DOCUMENTS

| | | |
|---|---|---|
| 0488542 | 6/1992 | European Pat. Off. . |
| 0532295 | 3/1993 | European Pat. Off. . |

Primary Examiner—Joseph Mancuso
Assistant Examiner—Timothy M. Johnson
Attorney, Agent, or Firm—Edward W. Goodman

[57] ABSTRACT

In a picture signal enhancement circuit having a circuit (3) for measuring a histogram and a non-linear processing circuit (1), coupled to the measuring circuit (3), for enhancing the picture signal in dependence upon the measured histogram, the histogram is measured only at transitions in the picture signal.

4 Claims, 2 Drawing Sheets

PICTURE SIGNAL ENHANCEMENT CIRCUIT INCLUDES A NON-LINEAR CIRCUIT FOR ENHANCING THE PICTURE SIGNAL IN DEPENDENCE OF HISTOGRAMS MEASURED AT TRANSITIONS IN THE PICTURE SIGNAL

This is a continuation of application Ser. No. 08/318,006, filed Oct. 4, 1994, now abandoned.

BACKGROUND OF THE INVENTION

1. Field of the Invention

The invention relates to a picture signal enhancement circuit including means for measuring a histogram and a non-linear processing circuit coupled to the measuring means for enhancing the picture signal in dependence upon the measured histogram. The invention also relates to a display apparatus provided with such a picture signal enhancement circuit.

2. Description of the Related Art

A picture signal enhancement circuit of the type described in the opening paragraph is generally known. In this circuit, the amplitude range of the picture signal can be divided into a number of histogram segments, whereafter it is determined, by means of a measurement per histogram segment, how often a pixel value or how long the picture signal occurs with an amplitude in the relevant histogram segment. Subsequently, the picture signal can be processed by means of a non-linear circuit having a transfer characteristic which is based on the integral of the histogram: per histogram segment, the picture signal is amplified by a factor which depends on the contents of the relevant measured histogram segment. In analog embodiments, the non-linear processing circuit is constituted by a non-linear amplifier, and in digital embodiments, the non-linear processing circuit involves a memory which is used as a look-up table. Until now, such picture signal enhancement techniques have led to a picture enhancement which is not satisfactory enough, so that they have not been generally introduced.

SUMMARY OF THE INVENTION

It is, inter alia an object of the invention to provide a picture signal enhancement circuit and a display apparatus yielding a better result than known picture signal enhancement circuits. To this end a first aspect of the invention provides a picture signal enhancement circuit comprising means for measuring a histogram, and a non-linear processing circuit, coupled to the measuring means, for enhancing the picture signal in dependence upon the measured histogram, characterized in that the histogram is measured only at transitions in the picture signal. A second aspect of the invention provides a display apparatus provided with a picture signal enhancement circuit comprising means for measuring a histogram, a non-linear processing circuit, coupled to the measuring means, for enhancing the picture signal in dependence upon the measured histogram, and a display device coupled to the non-linear processing circuit, characterized in that the histogram is measured only at transitions in the picture signal.

The invention is based on the recognition that when histogram correction is performed in the hitherto conventional way described hereinbefore, the histogram correction actually contributes to elimination of the gamma distortion caused by the picture pick-up device, while the picture display device subsequently once more eliminates the gamma distortion caused by the picture pick-up device. The Applicant has found that when the histogram is only corrected at transitions in the picture, this double elimination of the gamma distortion caused by the picture pick-up device does not occur, while a very attractive picture enhancement is achieved. The invention further provides the advantage that the picture enhancement is based on those areas in the picture to which the human eye is particularly sensitive, viz. the transitions. In addition to a contrast improvement, an increased modulation depth or improvement of definition is provided in the histogram segment within which most amplitude values occur around transitions in the picture signal, to which transitions, as stated, the eye is most sensitive. This is caused by the fact that, according to the invention, the histogram is measured around these transitions only so that, exclusively, the amplitude values around the transitions determine which histogram segment will comprise most amplitude values, hence, which amplitude range of the input signal will be optimally amplified by the histogram-dependent picture enhancement.

These and other aspects of the invention will be apparent from and elucidated with reference to the embodiments described hereinafter.

DETAILED DESCRIPTION OF THE PREFERRED EMBODIMENTS

Figure 1:
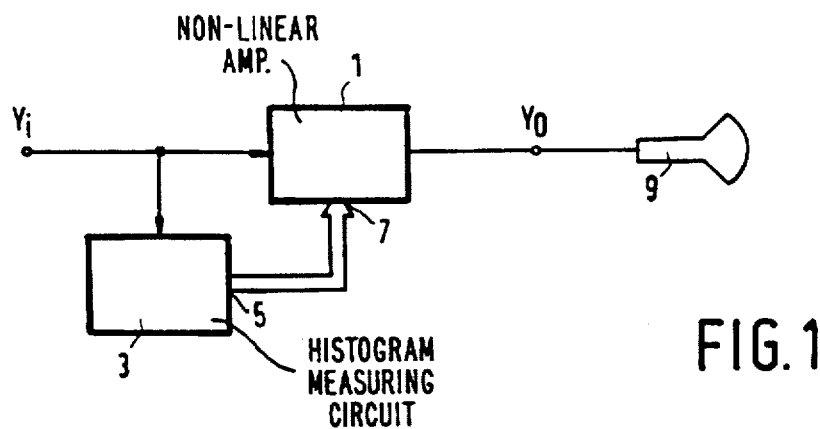
FIG. 1 is a block diagram of a display apparatus provided with an embodiment of a picture enhancement circuit using histogram correction.

In the block diagram of a display apparatus provided with an embodiment of a picture signal enhancement circuit according to FIG. 1, an input luminance signal Yi is applied to a non-linear amplifier 1 and to a histogram measuring circuit 3 which has a control signal output combination 5 coupled to a control signal input combination 7 of the non-linear amplifier 1, so that the latter enhances the picture signal in dependence upon the measured histogram. The non-linear amplifier 1 applies an output luminance signal Yo to a display device 9.

Figure 2:
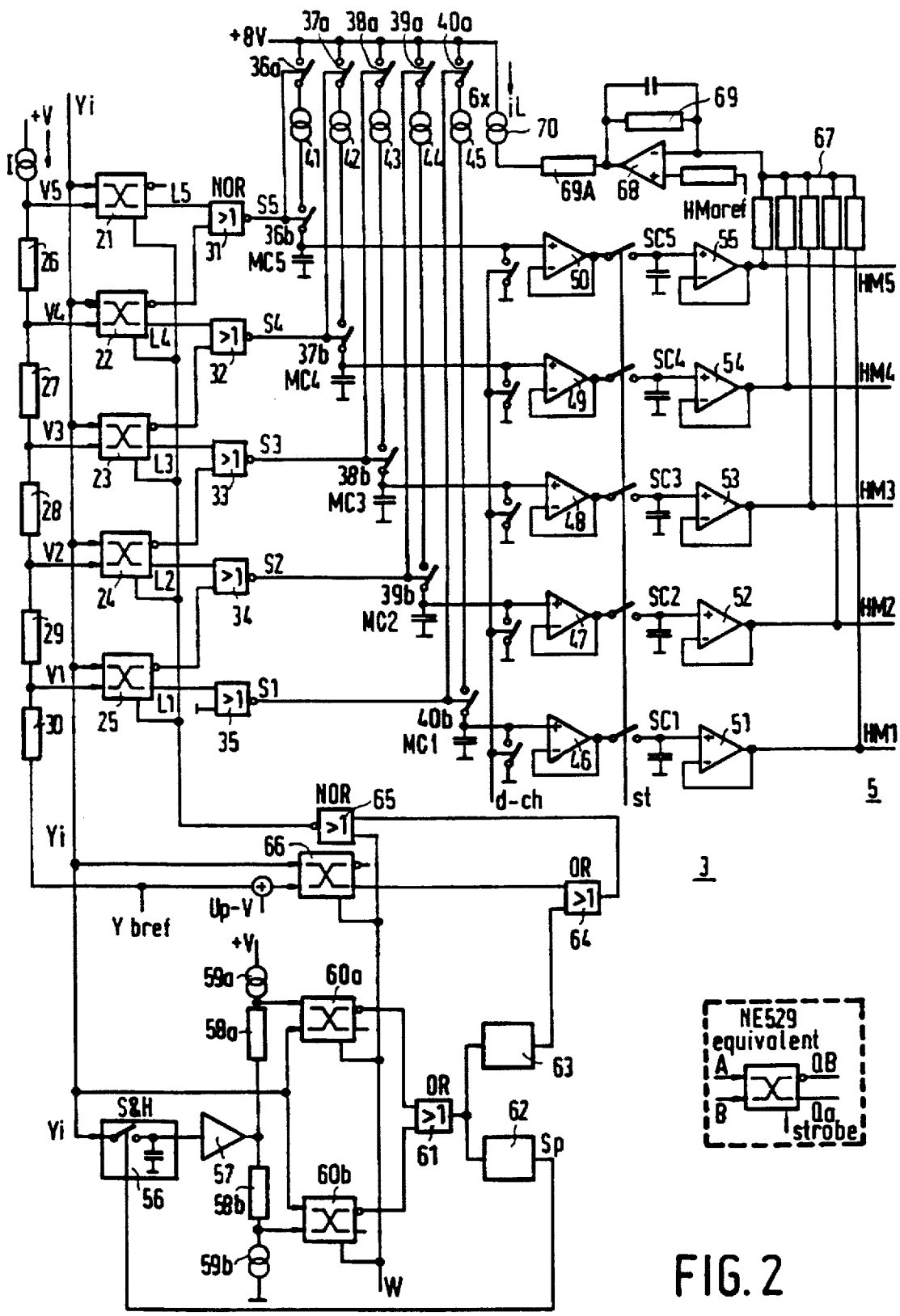
FIG. 2 shows a circuit diagram of an embodiment of a histogram measuring circuit according to the invention.

FIG. 2 shows a preferred embodiment of the histogram measuring circuit 3 of FIG. 1. To determine within which of the five histogram segments the input luminance signal Yi occurs, the input luminance signal Yi is applied to first inputs of five comparators 21–25. Second inputs of the comparators 21–25 are connected to a resistance ladder 26–30 through which a current supplied by a current source I flows. The lowest reference voltage level is applied to a black level reference voltage terminal Vbref; the other connections of the resistance ladder convey a higher voltage. Outputs of the comparators 21–25 are connected to first inputs of logic NOR circuits 31–35, second inputs of which are connected to the outputs of the comparators 22–25 and ground, respectively. Output signals S5–S1 of the NOR circuits 31–35 indicate within which histogram segment the input luminance signal Yi occurs. These output signals S5–S1 control switches 36a,b–40a,b in such a way that upon occurrence of a switching signal Sx, an associated current source of five current sources 41–45 is connected to a measuring capacitor MCx of five measuring capacitors MC5–MC1, so that the charge at the measuring capacitor MCx indicates how long the input luminance signal Yi has hitherto occurred within the histogram segment associated with the measuring capacitor MCx. It is feasible to use only a single current source instead of five current sources 41–45, but when only one current source was used, it appeared that errors caused by parasitic capacitances occurred.

At the end of a field period of the picture signal, the histogram segment values stored in the measuring capacitors MC1–MC5 are transferred via buffer amplifiers 46–50 to storage capacitors SC1–SC5; switches, controlled by a storage signal ST and arranged between the buffer amplifiers 46–50 and the storage capacitors SC1–SC5, are rendered conducting for this purpose. Prior to the new field period, the measuring capacitors MC1–MC5 are subsequently discharged by means of short-circuit switches controlled by a discharge signal d-ch and rendered conducting for this purpose. The histogram segment values HM1–HM5 present at the storage capacitors SC1–SC5 are applied via buffer amplifiers 51–55 to the output combination 5 of the histogram measuring circuit 3. It will be evident that a different number of histogram segments will be accompanied by a correspondingly different number of comparators, resistors and NOR circuits. However, it has been found that said number of five histogram segments yielded good results.

According to the invention, histogram values are determined only around transitions in the picture signal. To this end, the input luminance signal Yi is applied to a circuit part which detects the transitions in the picture signal and ensures that the comparators function only at transitions in the picture signal. The input luminance signal Yi is applied to a sample-and-hold circuit (S&H) 56 which takes a sample of the input luminance signal Yi only when a sampling control signal applied thereto indicates this. Via a buffer 57, the sample is applied to a connection between resistors 58a and 58b of a series arrangement of a current source 59a, the resistor 58a, the resistor 58b and a current source 59b. In this way two threshold values are obtained by means of the sample, which values are slightly above and slightly below the amplitude of the sample. The connection between the current source 59a and the resistor 58a is connected to a first input of a comparator 60a, while the connection between the current source 59b and the resistor 58b is connected to a first input of a comparator 60b. The input luminance signal Yi is applied to second inputs of the comparators 60a and 60b. A logic OR circuit 61 connected to the outputs of the comparators 60a and 60b, indicates when the input luminance signal Yi exceeds one of the threshold values, hence when there is a transition in the picture signal. The pulse supplied by the OR circuit 61 is converted by a first control signal generator 62 into a sampling control signal which is suitable for the sample-and-hold circuit 56. A second control signal generator 63, which is also connected to the OR circuit 61, applies a control signal to the comparators 21–25 via logic circuits 64 and 65, to be described hereinafter, at the transitions in the picture signal indicated by the OR circuit 61, which control signal determines the measuring period subsequent to a transition in the picture. Since there are as many rising edges as falling edges in a picture, the histogram is measured at as many high and low levels as when a measuring period around (and both before and after) a transition (edge) was indicted by the control signal. However, if a measurement were to take place around a transition, the signal would have to be delayed to some extent; in the mode described with reference to this embodiment, in which a measurement takes place only after an edge, a compensating delay circuit required for this delay is thus not necessary.

In accordance with a refined embodiment of the invention, picture signals which are larger than 90% of the nominally maximum picture signal value are not taken into account in the histogram measurement. Consequently, the brightest picture signal parts are slightly compressed in amplitude in favor of the other picture signal parts, which is in conformity with the decreasing sensitivity of the human eye to light parts in the picture. To this end, the input luminance signal Yi is applied to a first input of a comparator 66, a second input of which receives a reference voltage at 90% of the nominally maximum picture signal value. This reference voltage is obtained by adding the voltage Up minus 10% (=V) covered by the histogram to the black level reference voltage Vbref. An output signal of the comparator 66 is combined in the logic OR circuit 64 with the control signal generated by the control signal generator 63.

In accordance with a further refined embodiment of the invention, the histogram is determined only in a central window in the picture. In this way, it is avoided that logos of broadcasting stations in the upper part of the picture, sub-titles in the lower part of the picture, and black bars in the upper and lower part of the picture of letterbox television signals, such as PALplus, affect the histogram-controlled picture enhancement. To this end, a window control signal W is applied to the comparators 60a and 60b and 66, and to the logic NOR circuit 65 for combination with the control signal supplied by the OR circuit 64 and intended for the comparators 21–25.

As is shown in FIG. 2, the commercially available integrated circuit NE529 can be used for each of the comparators 21–25, 60a and 60b and 66.

Due to the inventive measure of determining the histogram only at transitions (and possibly when also the picture signal is not more than 90% of its nominal maximum value), the sum of the histogram segment values is no longer equal to the total number of pixels or the total picture duration in the measuring window. Consequently, the extent of non-linearity, and hence the effectiveness in the picture enhancement of the non-linear processing circuit 1 decreases. In accordance with an elaboration of the invention, this is compensated for by comparing the mean value of the measured histogram segment values with a reference value (HMaref) which is equal to what this mean value should be if the histogram were measured continuously. The mean value at a continuous histogram measurement is known, because this value is equal to the total number of pixels or the total period of time within the measuring window, divided by the number of histogram segments. The mean value of the measured histogram values is determined by a resistive network 67 which is connected to the output combination 5 of the histogram measuring circuit 3. This mean value and the reference value HMaref are applied to a differential amplifier 68 which is negatively fed back by means of an RC parallel circuit 69. An output of the differential amplifier 68 is coupled via a resistor 69A an input stage 70 of a current mirror circuit, whose output stages are constituted by the current sources 41–45 described hereinbefore. In this way, the difference between the mean value of the measured histogram values and the reference value HMaref determines the value of the currents supplied by the current sources 41–45, with which currents the measuring capacitors MC1–MC5 are charged whenever the input luminance signal Yi occurs within the respective histogram segment. In this way, the values of all histogram segments are equally multiplied by a given correction factor so that the average of these values is equal to the reference value HMaref.

Figure 3:
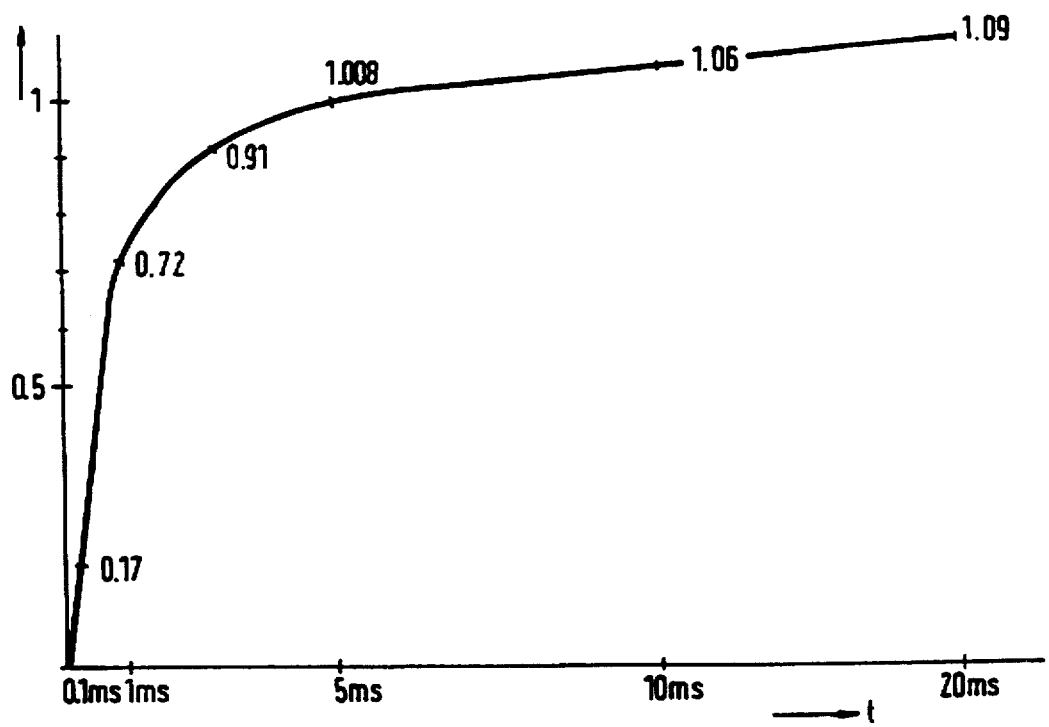
FIG. 3 shows a diagram indicating the relation between the total measuring period of actual measurement of the histogram at transitions in the picture, and a correction factor which can be used in the histogram correction in accordance with an embodiment of the invention.

In accordance with a refinement of this correction, this correction of the histogram segment values is only performed if the mean value of the measured histogram segment values does not deviate too much from the reference value HMaref. FIG. 3 shows a desired relation between the total period of actual measurement of the histogram at transitions (plotted on the horizontal axis), and a factor by which the difference between the mean value of the measured histogram values and the reference value HMaref is multiplied before the correction factor mentioned hereinbefore is determined on the basis of this difference.

It is to be noted that the embodiments described hereinbefore elucidate instead of limit the invention and that those skilled in the art will be able to design many alternative embodiments without departing from the scope of the appendant claims. Particularly the method, shown in FIG. 2, of measuring the histogram only at transitions in the picture signal is certainly not the only method possible. It is alternatively possible to regularly take sampling clock-controlled samples of the input luminance signal Yi and to consider the difference between two or more consecutive samples for detecting a transition in the picture signal. It is alternatively possible to use the quotient between the reference value HMaref and the actual mean value instead of the difference between the actual mean value of the measured histogram values and the reference value HMaref so as to determine the correction factor by which the currents of the current sources 41–45 must be multiplied. The correction factor may then be substantially equal to the quotient if this quotient is smaller than a predetermined threshold value, whereas the factor decreases to zero with an increase of the quotient if a quotient is larger than the threshold value. Instead of the analog histogram measurement described above, in which capacitors are charged, the histogram may alternatively be determined digitally by means of counters whose counts are incremented whenever a pixel value falls within the histogram segment associated with the counter.

I claim:

1. A picture signal enhancement circuit comprising means for measuring a histogram, and a non-linear processing circuit, coupled to the measuring means, for enhancing the picture signal in dependence upon the measured histogram, characterized in that the histogram is measured only at transitions in the picture signal, wherein the picture signal has a first number of pixels for which the histogram can be determined, while the histogram is actually determined at the transitions for a second number of pixels, the histogram comprising a predetermined number of histogram segments, and the contents of each of these histogram segments being multiplied by a correction factor which depends on a difference between the first number and the second number of pixels.

2. A picture signal enhancement circuit as claimed in claim 1, wherein the difference is multiplied by a value which decreases with an increase of the difference before the correction factor is determined on the basis of said difference.

3. A picture signal enhancement circuit comprising means for measuring a histogram, and a non-linear processing circuit, coupled to the measuring means, for enhancing the picture signal in dependence upon the measured histogram, characterized in that the histogram is measured only at transitions in the picture signal, wherein the picture signal has a first period of time per picture for which the histogram can be determined, while the histogram is actually determined at the transitions for a total second period of time, the histogram comprising a predetermined number of histogram segments, and the contents of each of these histogram segments being multiplied by a correction factor which depends on a difference between the first period of time and the second period of time, respectively.

4. A picture signal enhancement circuit as claimed in claim 3, wherein the difference is multiplied by a value which decreases with an increase of the difference before the correction factor is determined on the basis of said difference.

\* \* \* \* \*